United States Patent
Lee et al.

(10) Patent No.: US 7,848,526 B2
(45) Date of Patent: Dec. 7, 2010

(54) METHOD OF RECEIVING SESSION KEY IN HOME NETWORK AND METHOD OF REPRODUCING CONTENT USING THE SAME

(75) Inventors: Jae-heung Lee, Gyeonggi-do (KR); Myung-sun Kim, Gyeonggi-do (KR); Sung-hyu Han, Seoul (KR); Yong-kuk You, Seoul (KR); Bong-seon Kim, Gyeonggi-do (KR); Young-sun Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1429 days.

(21) Appl. No.: 11/268,647

(22) Filed: Nov. 8, 2005

(65) Prior Publication Data

US 2006/0107051 A1 May 18, 2006

Related U.S. Application Data

(60) Provisional application No. 60/628,559, filed on Nov. 18, 2004.

(30) Foreign Application Priority Data

Dec. 1, 2004 (KR) .................. 10-2004-0099776

(51) Int. Cl.
 *H04L 9/00* (2006.01)
(52) U.S. Cl. ..................................... 380/279
(58) Field of Classification Search .......... 380/247, 380/279, 286, 44, 270, 273; 713/171, 168
 See application file for complete search history.

(56) References Cited

U.S. PATENT DOCUMENTS

| | | | |
|---|---|---|---|
| 6,047,071 A * | 4/2000 | Shah | 380/273 |
| 6,263,435 B1 * | 7/2001 | Dondeti et al. | 713/163 |
| 6,530,020 B1 * | 3/2003 | Aoki | 713/163 |
| 6,636,968 B1 | 10/2003 | Rosner et al. | |
| 6,763,112 B1 * | 7/2004 | Haumont | 380/247 |
| 7,120,421 B2 * | 10/2006 | Hermann et al. | 455/410 |
| RE40,708 E * | 5/2009 | Dondeti et al. | 713/163 |
| 2004/0059939 A1 | 3/2004 | De Jong | |
| 2004/0133908 A1 | 7/2004 | Smith et al. | |

FOREIGN PATENT DOCUMENTS

| | | |
|---|---|---|
| EP | 1-211-898 A2 | 10/2001 |
| JP | 09-163338 A | 6/1997 |
| KR | 10-2001-0073905 A | 8/2001 |
| KR | 2001-0114188 A | 12/2001 |
| KR | 10-2003-0036108 A | 5/2003 |
| KR | 10-2004-0046691 A | 6/2004 |

\* cited by examiner

*Primary Examiner*—Beemnet W Dada
(74) *Attorney, Agent, or Firm*—Sughrue Mion, PLLC (57) ABSTRACT

A method of receiving a session key in a home network and a method of reproducing content using the same. The method of receiving a session key from a home server in a home network, includes: (a) whenever one of members of the home network changes, receiving and storing the session key and a session version indicating a session key generation sequence; (b) receiving a license necessary for reproducing predetermined content; and (c) determining a session key necessary for reproducing the predetermined content based on an encoding session version (ESV), which is a session version extracted from the license, and the stored session version. A home server transmits a session key and a session version to a user device whenever a subscriber to a home network changes, and the user device determines a session key using the session version, thereby performing a variety of domain administration by freely transmitting content between user devices.

18 Claims, 8 Drawing Sheets

METHOD OF RECEIVING SESSION KEY IN HOME NETWORK AND METHOD OF REPRODUCING CONTENT USING THE SAME

This application claims the benefit of Korean Patent Application No. 10-2004-0099776, filed on Dec. 1, 2004, in the Korean Intellectual Property Office, and U.S. Patent Ser. No. 60/628,559, filed on Nov. 18, 2004, in the U.S. Patent Trademark Office, the disclosures of which are incorporated herein in their entireties by reference.

BACKGROUND OF THE INVENTION

1. Field of the Invention

The present invention relates to a method of receiving a session key in a home network and a method of reproducing content using the same, and more particularly to, a method of receiving a session key that makes it easy to administer members of a domain using the session key and a session version of the session key and a method of reproducing content using the same.

2. Description of the Related Art

Digital contents are generally transmitted from a content provider to a user. To protect the unauthorized use of the contents, only an authorized user who paid a content fee can use the digital contents.

Digital contents are encoded using a content key and the authorized user must have the content key in order to prevent unauthorized users from obtaining the contents.

The development of home network technologies makes it possible to move digital contents between user devices. A user who wishes to use digital contents on one or more user devices must pay a fee only once. However, when the contents are moved between user devices in a manner of reproduction, an unauthorized user can obtain and use the contents. Hence, a home network technology capable of moving digital contents between user devices in a user home network and preventing an unauthorized user from obtaining and using the contents are required.

In particular, with respect to high definition (HD) contents in U.S. digital broadcasting, the U.S. Federal Communication Commission has required from July 2005 a technology that adds a 1-bit broadcast flag (BF) in order to prevent an unauthorized user from using the contents. Digital broadcasting contents between a home server and user devices must be securely used.

Figure 1:
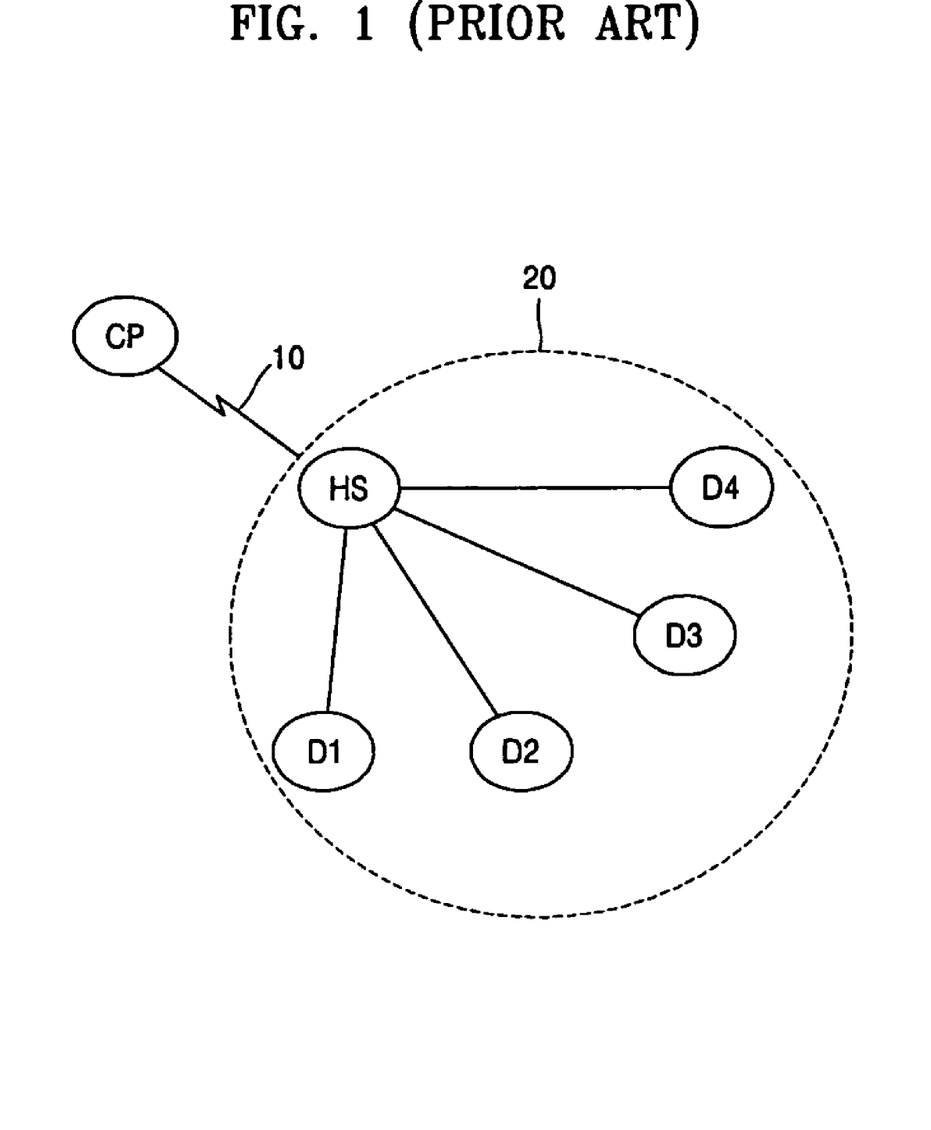
FIG. 1 is a diagram illustrating a structure of a home network.

FIG. 1 is a diagram illustrating a structure of a home network. Referring to FIG. 1, a content provider (CP) transmits content to a home server (HS) through a transmission channel 10.

The HS is connected to user devices D1, D2, D3, D4, administers a subscription and a withdrawal of an authorized user device, and transmits the contents to authorized user devices, i.e., joined devices.

A domain is a group of user devices connected to one HS. The domain changes whenever new user devices join to, or older user devices withdraw from, the home network. A domain administration method using a session key is used to prevent a withdrawn user device from obtaining the content.

Figure 2:
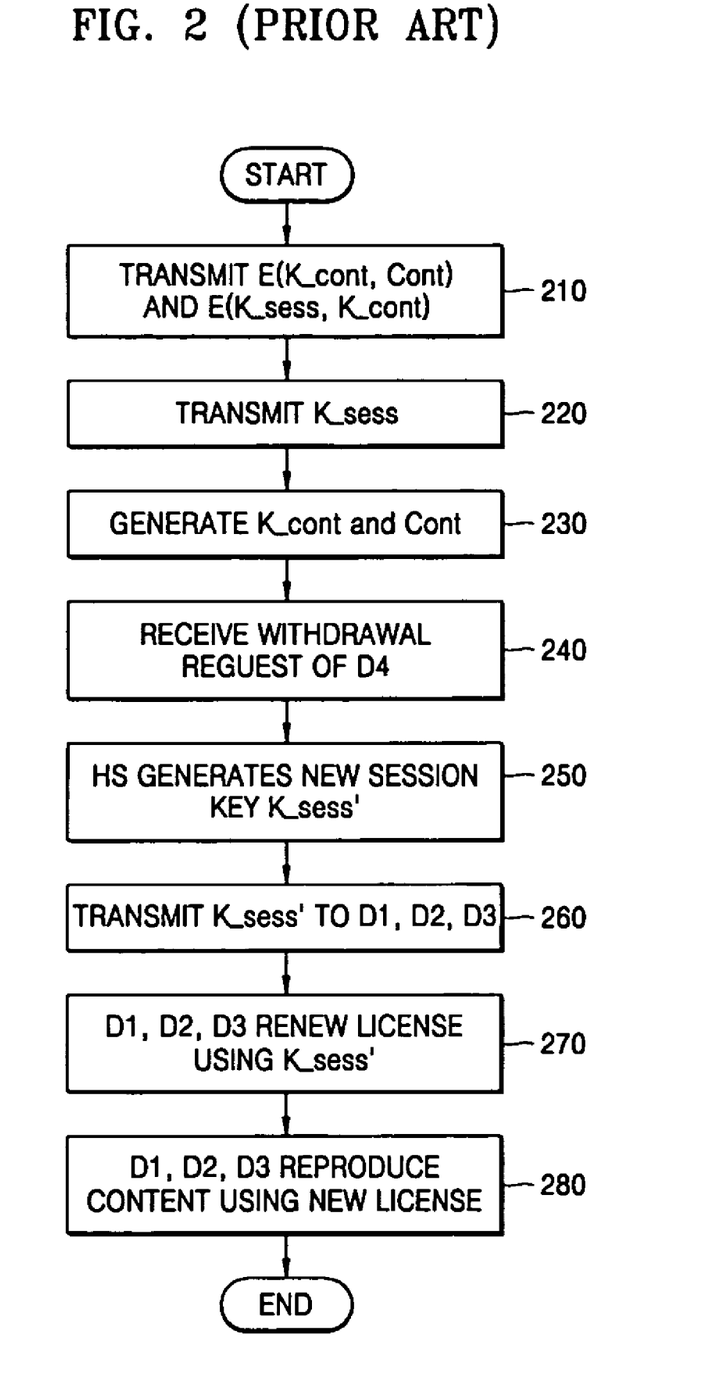
FIG. 2 is a flowchart illustrating a conventional domain administration method.

FIG. 2 is a flowchart illustrating a conventional domain administration method. Referring to FIG. 2, the HS transmits encoded content E K_cont, Cont that is created by encoding content Con using a predetermined content key K_cont, and an encoded content key E K_sess, K_cont that is generated by encoding the content key K_cont using a predetermined session key K_sess to current user devices D1, D2, D3, D4 (Operation 210). The current user devices are referred to as authorized devices that have joined to and are connected to the HS. The encoded content key E K_Sess, K_cont is stored in each of the user devices D1, D2, D3, D4 in a file format of a license.

The HS transmits the session key K_sess used to encode the content key to the user devices D1, D2, D3, D4 through a secure transmission route (Operation 220).

The user devices D1, D2, D3, D4 decode the encoded content key E K_sess, K_cont using the session key K_sess to obtain the content key K_cont, and decode the encoded content key E K_cont, Cont using the content key K_cont to obtain and reproduce content Cont (Operation 230).

Suppose that the user device D4 withdraws from the home network (Operation 240).

The HS generates a new session key K_sess' (Operation 250) and transmits the generated session key K_sess' to the user devices D1, D2, D3 (Operation 260).

The user devices D1, D2, D3 encode the content key K_cont using the session key K_sess', generate a new encoded content key E K_sess', K_cont, and store the encoded content key E K_sess', K_cont in the license file (Operation 270). The user devices D1, D2, D3 renew the license file.

The user devices D1, D2, D3 decode the encoded content key E K_sess', K_cont using the new session key K_sess' to obtain the content key K_cont, and decode the encoded content key E K_cont, Cont using the content key K_cont to obtain and reproduce content Cont (Operation 280).

New content Cont' is transmitted to the user devices D1, D2, D3 using the new session key K_sess'. The HS transmits encoded content E K_cont', Cont' created by encoding new content Cont' using a predetermined new content key K_cont', and an encoded content key E K_sess', K_cont' that is generated by encoding the content key K_cont' using the new session key K_sess' to the current user devices D1, D2, D3.

The user device D4 cannot obtain the content key K_cont' for newly transmitted content Cont' since it does not have the new session key K_sess'. Therefore, the user device D4 cannot reproduce content distributed in the home network after withdrawing from the home network.

According to the conventional method, the user device D4 cannot receive and reproduce content Cont transmitted to each of the user devices before withdrawing from the home network.

When the user device D4 does not have the content key K_cont, the user device D4 can obtain the content key K_cont by receiving the license file including the encoded content key E K_sess, K_cont. However, after withdrawal of the user device D4, since the user devices D1, D2, D3 renew the license, the user device D4 does not have the encoded content key E K_sess, K_cont using the session key K_sess any more, thereby failing to obtain the content key K_cont.

When the user device D4 loses the content E K_cont, Cont and the content key K_cont, although the user device D4 can use content Cont that is content before withdrawing from the home network, the user device D4 cannot use the content E K_cont, Cont transmitted from the user devices D1, D2, D3.

SUMMARY OF THE INVENTION

The present invention provides a method of receiving a session key that makes it easy to perform a variety of domain administration tasks by freely transmitting content between user devices using the session key and a session version of the session key and a method of reproducing content using the same.

According to an exemplary embodiment of the present invention, there is provided a method of receiving a session key from a home server in a home network, comprising: (a) whenever one of the members of the home network changes, receiving and storing the session key and a session version indicating a session key generation sequence; (b) receiving a license necessary for reproducing predetermined content; and (c) determining a session key necessary for reproducing the predetermined content based on an encoding session version (ESV), which is a session version extracted from the license, and the stored session version.

The license may include a server unique identifier (SUID), which is an identifier of the home server, the method further comprising: (d), before operation (c), determining the session key necessary for reproducing the predetermined content by determining whether the SUID included in the license is a SUID of the home server to which a user device that receives the session key belongs.

The operations (c) and (d) may be performed based on a current session key table (CSKT) in which the CSKT includes a SUID of a current home server, a current session version, and a current session key.

The license may include an encoded content key which is generated by encoding the content key using the SUID, the session version, and the session key, and operation (c) is performed by comparing the session version included in the license with the session version included in the CSKT.

The license may include an encoded content key which is generated by encoding the content key using the SUID, the session version, and the session key, and wherein operation (d) is performed by determining whether the SUID included in the license belongs to the SUID of the CSKT.

The operations (c) and (d) may be performed based on a previous session key table (PSKT) in which the PSKT includes one or more SUIDs of a previous home server, one or more previous session versions, and one ore more previous session keys.

The operation (c) may comprise: (c1) when the session version of the license is identical to the current session version, determining the current session version as the session key; and (c2) when the session version of the license is smaller than the current session version, checking whether the PSKT includes the session version of the license, if the PSKT includes the session version of the license, determining a previous session key as the session key.

The operation (d) may comprise (d1) when the SUID of the license is not identical to the SUID of the CSKT, determining the content as reproduction unavailable.

The method may further comprising: (e) when a session key necessary for reproducing the content is not identical to the stored session key, renewing the session key by receiving a latest session key and a session version of the latest session key from the home server of the home network.

According to another exemplary embodiment of the present invention, there is provided a method of receiving predetermined content from a first user device in a home network and reproducing the predetermined content by a second user device, comprising: (a) whenever one of the members of the home network changes, receiving and storing a session key and a session version indicating a session key generation sequence which are necessary for reproducing the predetermined content; (b) receiving encoded content using a predetermined content key, and a license necessary for reproducing the predetermined content from the first user device; (c) determining a session key necessary for reproducing the predetermined content based on a session version included in the license and the stored session version; and (d) generating a content key using the determined session key, and reproducing the encoded content using the generated content key.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Exemplary embodiments of the present invention will now be described more fully with reference to the accompanying drawings.

Figure 3:
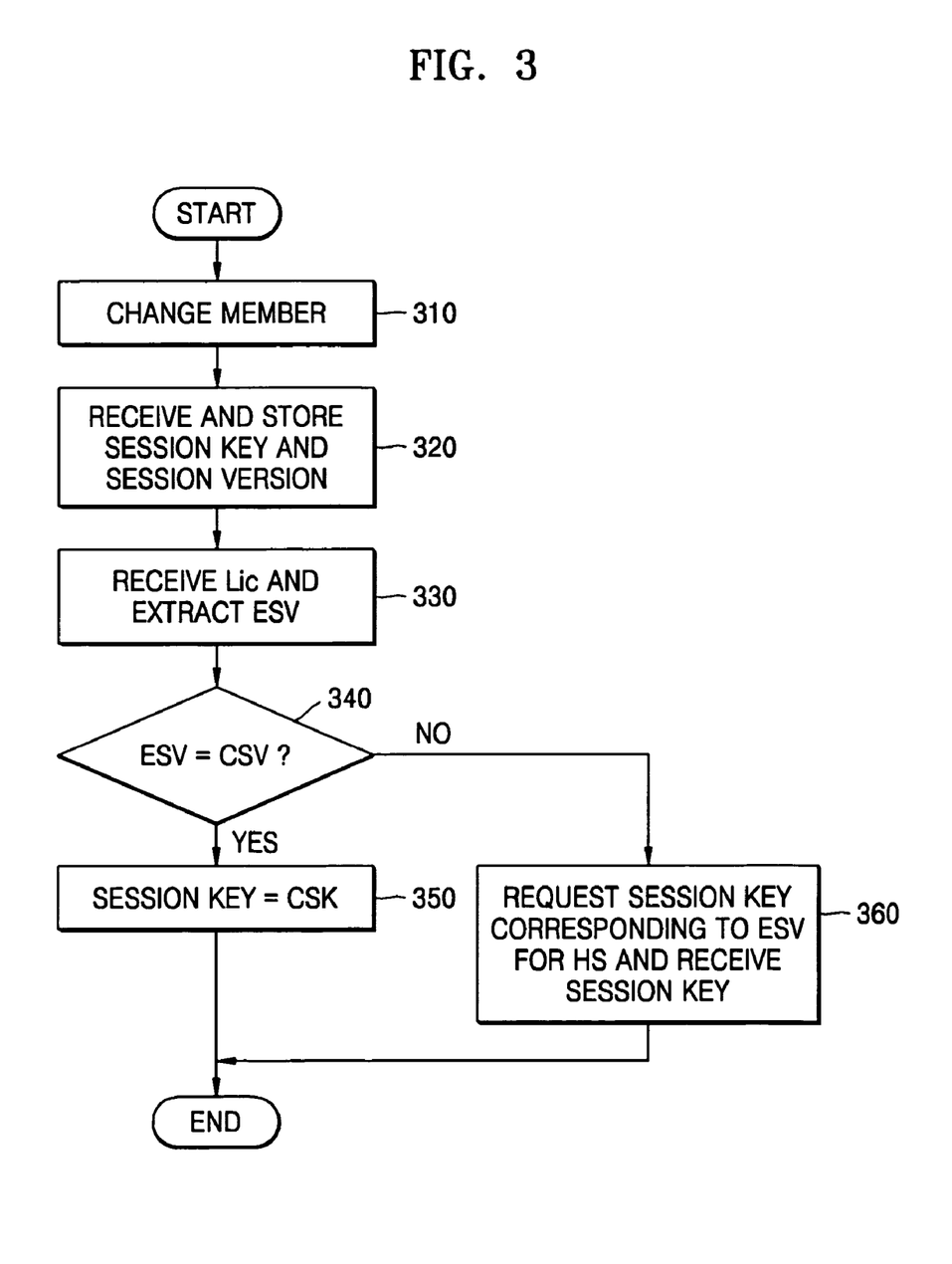
FIG. 3 is a flow chart illustrating a method of receiving a session key according to an embodiment of the present invention.

FIG. 3 is a flow chart illustrating a method of receiving a session key according to an exemplary embodiment of the present invention. Referring to FIG. 3, a subscription or withdrawal of a user device causes a change in the members of a home network (Operation 310).

Whenever one of the members of the home network changes, the user device receives the session key and a session version indicating a session key generation sequence from a home server (HS) and stores the session version and the session key (Operation 320).

If user devices D1, D2, D3, D4 have obtained a content key K_cont using a session key K_sess whose session version is 1, and user device D4 withdrew from the home network, the HS transmits a new session key K_sess' and the session version=0002 of the new session key K_sess' to current user devices D1, D2, D3. That is, user devices D1, D2, D3 receive the new session key K_sess' and the session version=0002 from the HS and the user devices store them.

The user devices D1, D2, D3 store the session key and session version in a current session key table (CSKT) as shown in Table 1.

TABLE 1

| CSV (current session version) | CSK (current session key) |
| --- | --- |
| 0002 | 2222 |

In Table 1, a current session key (CSK) is 2222, and the session version is renewed from 0001 to 0002.

The user devices D1, D2, D3 receive a license Lic necessary for reproducing predetermined content, and extract an encoding session version (ESV) from the received license Lic (Operation 330). The ESV is a number that indicates the session key generation sequence used to encode the content key used by the HS to decode corresponding content. The license Lic is configured as shown in Table 2.

TABLE 2

| | |
|---|---|
| ESV (encoding session version) | Session version of the session key K_sess used to encode the content key K_cont |
| ECK (encoded content key) | E(K_sess, K_cont) |

The license Lic is used to reproduce content Cont, the content key K_cont is used to encode content Cont, and the session key K_sess is used to encode the content key K_cont.

The user devices D1, D2, D3 check whether the ESV extracted at Operation 330 is the same as a current session version (CSV) of the CSKT (Operation 340). If they are identical to each other, then Operation 350 is performed. If they are not identical to each other, Operation 360 is performed.

The user devices D1, D2, D3 extract the CSK corresponding to the CSV as the session key (Operation 350).

The user devices D1, D2, D3 request the HS for the session key corresponding to the ESV, and receive the session key through a user authentication (Operation 360).

Figure 4:
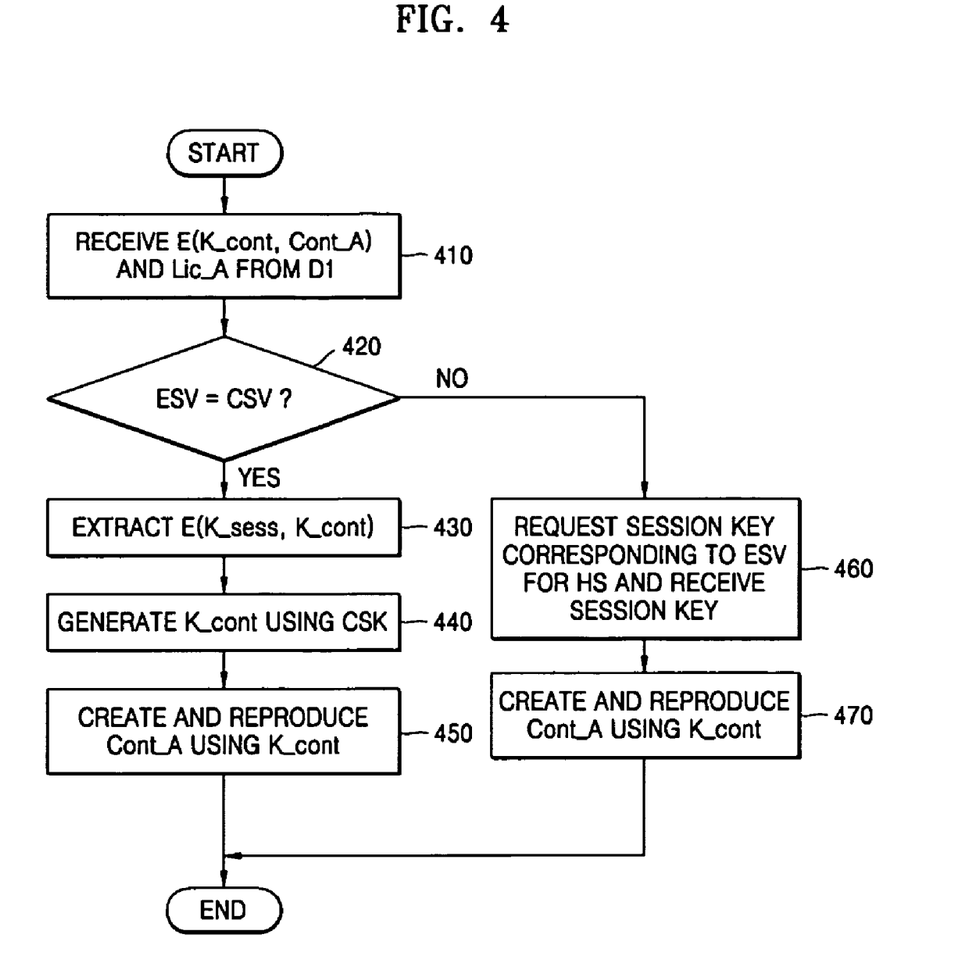
FIG. 4 is a flowchart illustrating a method in which withdrawn user device D4 receives content Cont_A from user device D1 and reproduces it using the session key obtained by the method shown in FIG. 3.

FIG. 4 is a flowchart illustrating a method in which the withdrawn user device D4 receives content Cont_A from the user device D1 and reproduces it using the session key obtained by the method shown in FIG. 3. The user devices D1, D2, D3, D4 that join to a home network HN of the HS at time t1 use content Cont_A. The user device D4 withdraws from the HN at time t2. According to the method of receiving the session key shown in FIG. 3, the HS will distribute content Cont_B to the user devices D1, D2, D3 using the new session key K_sess' after time t2, which is shown in Table 3.

TABLE 3

| | Time | |
|---|---|---|
| | t1 | After t2 |
| Content/License | cont_A/Lic_A | cont_B/Lic_B |
| Content key | K_cont | K_cont' |
| Session Key/Session Version | K_sess/0001 | K_sess'/0002 |
| Joined User Devices | D1, D2, D3, D4 | D1, D2, D3 |

Since the current user devices D1, D2, D3 use content Cont_A, they have the encoded content E K_cont, Cont_A, and a license Lic_A. However, since the session key is renewed due to a withdrawal of the user device D4, a CSKT of the user devices D1, D2, D3 after time t2 is shown in Table 4.

TABLE 4

| CSV | CSK |
|---|---|
| 0002 | 2222 |

Under these circumstances, the user device D4 that withdrew from the HN uses content Cont_A received from the user device D1 due to loss of Cont_A.

Referring to FIG. 4, the user device D4 receives encoded content E K_cont, Cont_A and the License Lic_A from the user device D1 (Operation 410).

Unlike the conventional method, a change in the members of the HN does not result in a license renewal. As shown in FIG. 3, the license Lic_A transmitted from the user device D1 includes an ESV=0001 and the encoded content key E K_sess, K_cont.

The user device D4 extracts the ESV from the license Lic_A, and compares the ESV with a CSV of the CSKT (Operation 420). If the ESV is identical to the CSV, Operation 430 is performed. If the ESV is not identical to the CSV, Operation 460 is performed.

Since the ESV=0001, and the CSV is also 0001, the content key K_cont used to reproduce content Cont_A is encoded using the same session key K_sess.

The user device D4 extracts the encoded content key K_sess, K_cont from the license Lic_A received at Operation 410 (Operation 430).

The user device D4 generates a content key K_cont by decoding the encoded content key E K_sess, K_cont extracted at Operation 430 using the CSK=K_sess of the CSKT (Operation 440).

The user device D4 extracts content Cont_A by decoding the encoded content E K_cont, Cont_A received at Operation 410 using the content key K_cont generated at Operation 440, and reproduces the extracted content Cont_A (Operation 450).

The user device D4 requests the session key corresponding to the ESV for the HS, and receives the session key through the user authentication (Operation 460).

The user device D4 generates the content key K_cont by decoding the encoded content key of the license Lic_A using the session key received at Operation 460, and reproduces content Cont_A (Operation 470).

According to the method shown in FIG. 4, since a change in subscribers does not cause a renewal of the license included in the user device, the CSV is always the same as the CSV at Operation 420. Therefore, Operations 430, 440, and 450 are performed while Operations 460 and 470 are not performed. That is, the withdrawn user device D4 can receive and use content before withdrawal from another user device D1.

Figure 5:
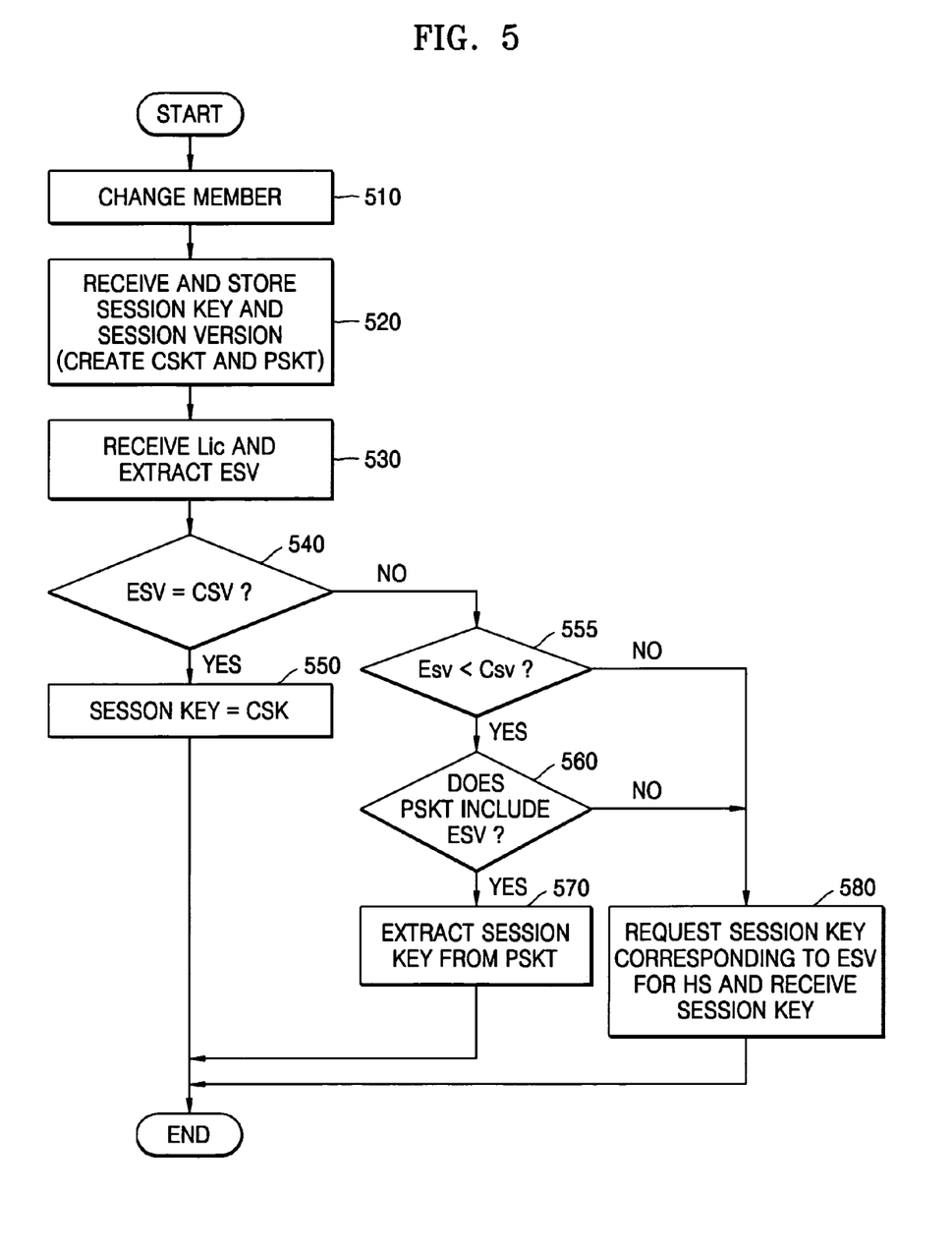
FIG. 5 is a flowchart illustrating a method of receiving a session key according to another embodiment of the present invention.

FIG. 5 is a flowchart illustrating a method of receiving a session key according to another exemplary embodiment of the present invention.

According to the method of receiving the session key shown in FIG. 5, while a withdrawn user device can receive and use content before withdrawal from another user device, a joined user device cannot receive and use content before withdrawal from another joined user device.

As show in FIG. 4, while the user device D4 can receive and use content Cont_A from the user device D1, since the user device D2 does not have the new session key K_sess' but the session key K_sess, the user device D2 cannot reproduce content Cont_A although the user device D2 receives content Cont_A from the user device D1. The method of receiving the session key shown in FIG. 5 provides a solution to the above problem.

Referring to FIG. 5, a subscription or withdrawal of a user device causes a change in members of the HN (Operation 510).

Whenever one of the members of the HN changes, all user device within the HN receives the session key and a session version indicating a session key generation sequence from the HS and stores the session key and the session version (Operation 520).

The user device stores a CSK and a CSV in a CSKT, and a previous session key (PSK), and a previous session version (PSV) in a previous session key table (PSKT), respectively. The CSKT and the PSKT are shown in Table 5 and Table 6, respectively.

TABLE 5

| CSV (current session version) | CSK (current session key) |
|---|---|
| 0004 | 4444 |

TABLE 6

| PSV (previous session version) | PSK (previous session key) |
|---|---|
| 0003 | 3333 |
| 0002 | 2222 |
| 0001 | 1111 |

The user devices D1, D2, D3 receive a license Lic necessary for reproducing predetermined content, and extract an ESV from the received license Lic (Operation 530).

The user device D4 withdraws from the HN at time t2, content Cont_A and content Cont_B are content before and after the withdrawal of the user device D4, respectively, and session keys distributed before and after the withdrawal of the user device D4 are K_sess and K_sess', respectively. Such circumstances are shown in Table 7.

TABLE 7

| | Time | |
|---|---|---|
| | t1 | After t2 |
| Content/License | cont_A/Lic_A | cont_B/Lic_B |
| Content key | K_cont | K_cont' |
| Session Key/Session Version | K_sess/0003 | K_sess'/0004 |
| Joined User Devices | D1, D2, D3, D4 | D1, D2, D3 |

The license Lic is configured as shown in Table 8 as in Table 2.

TABLE 8

| ESV (encoding session version) | Session version of the session key K_sess used to encode the content key K_cont |
|---|---|
| ECK (encoded content key) | E(K_sess, K_cont) |

The license Lic is used to reproduce content Cont, the content key K_cont is used to encode content Cont, and the session key K_sess is used to encode the content key K_cont.

The user devices D1, D2, D3 check whether the ESV extracted at Operation 520 is the same as the CSV of the CSKT (Operation 540). If they are identical to each other, Operation 550 is performed. The user devices D1, D2, D3 extract the CSK corresponding to the CSV as the session key (Operation 550). If they are not identical to each other, Operation 555 is performed, in which the user devices D1, D2, D3 compare a size of the ESV with a size of the CSV (Operation 555). When the ESV is smaller than the CSV, Operation 560 is performed. When the ESV is smaller than the CSV, the user devices D1, D2, D3 check if the PSKT includes the ESV (Operation 560). If the PSKT includes the ESV, Operation 570 is performed. The user devices D1, D2, D3 extract the session key corresponding to the ESV from the PSKT (Operation 570). When the ESV is larger than the CSV, Operation 580 is performed.

If the PSKT does not include the ESV, Operation 580 is performed.

When the ESV is larger than the CSV, or if the PSKT does not include the ESV, the user devices D1, D2, D3 request the session key corresponding to the ESV for the HS, and receives the session key through the user authentication (Operation 580).

Figure 6:
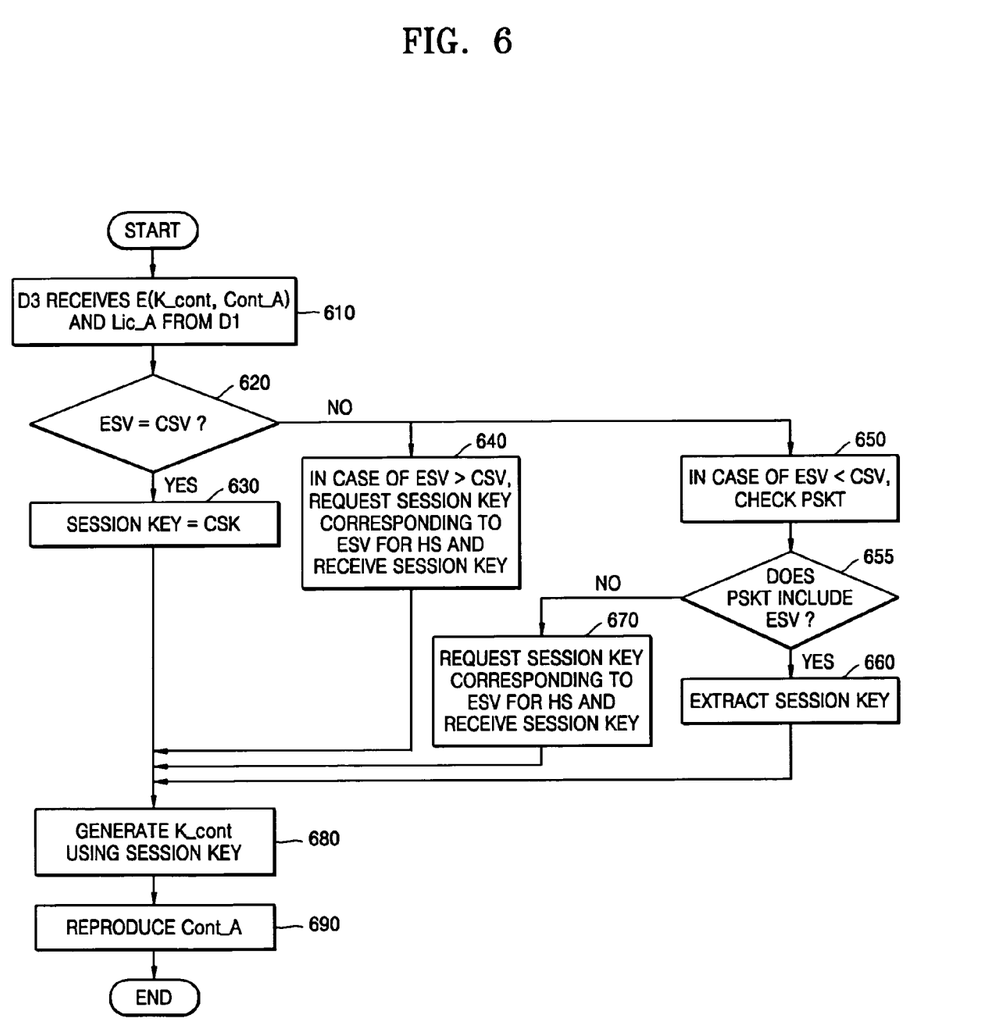
FIG. 6 is a flowchart illustrating a method in which user device D3 receives content Cont_A from user device D1 and reproduces it after user device D4 withdraws from a home network (HN) using the session key obtained by the method shown in FIG. 5.

FIG. 6 is a flowchart illustrating a method in which the user device D3 receives content Cont_A from the user device D1 and reproduces it after the user device D4 withdraws from the HN using the session key obtained by the method shown in FIG. 5. The user devices D1, D2, D3, D4 join the HN of the HS at time t1 and use content Cont_A, and the user device D4 withdrew from the HS at time t2, which are shown in Table 7.

Since the user devices D1, D2, D3 use content Cont_A, they have the encoded content E K_cont, Cont_A and the license Lic_A. However, since the session key is renewed due to the withdrawal of the user device D4, a CSKT and a PSKT of the user devices D1, D2, D3 after time t2 are the same as shown in Table 5 and Table 6.

Under these circumstances, the user device D3 uses content Cont_A received from the user device D1 due to loss of Cont_A after the user device D4 withdrew from the HN.

The user device D3 receives the encoded content E K_cont, Cont_A and the license Lic_A from the user device D1 (Operation 610).

As shown in Table 7, the license Lic_A transmitted from the user device D1 includes an ESV=0003 and the encoded content key E K_sess, K_cont.

The user device D3 extracts the ESV from the license Lic_A, and compares the ESV with a CSV of the CSKT (Operation 620). If the ESV is identical to the CSV, Operation 630 is performed. The user device D3 extracts a CSK corresponding to the CSV as the session key (Operation 630). If the ESV is not identical to the CSV, Operation 640 or Operation 650 is performed.

When the ESV is larger than the CSV, the user device D3 requests the session key corresponding to the ESV for the HS, and receives the session key through the user authentication (Operation 640).

When the ESV is smaller than the CSV, the user device D3 checks if the PSKT includes the ESV (Operation 650). If after checking in Operation 655 the PSKT includes the ESV, then Operation 660 is performed. If the PSKT does not include the ESV, Operation 670 is performed.

In Operation 660, the user device D3 extracts the session key corresponding to the ESV from the PSKT.

In Operation 670, the user device D3 requests the session key corresponding to the ESV for the HS, and receives the session key through the user authentication.

The user device D3 generates the content key K_cont by decoding the encoded content key of the license Lic_A received at Operation 610 using the session key received at Operation 640 or Operation 670, or the session key extracted at Operation 630 or Operation 660 (Operation 680).

The user device D3 generates content by decoding the encoded content using the content key K_cont generated at Operation 680, and reproduces content (Operation 690).

Figure 7:
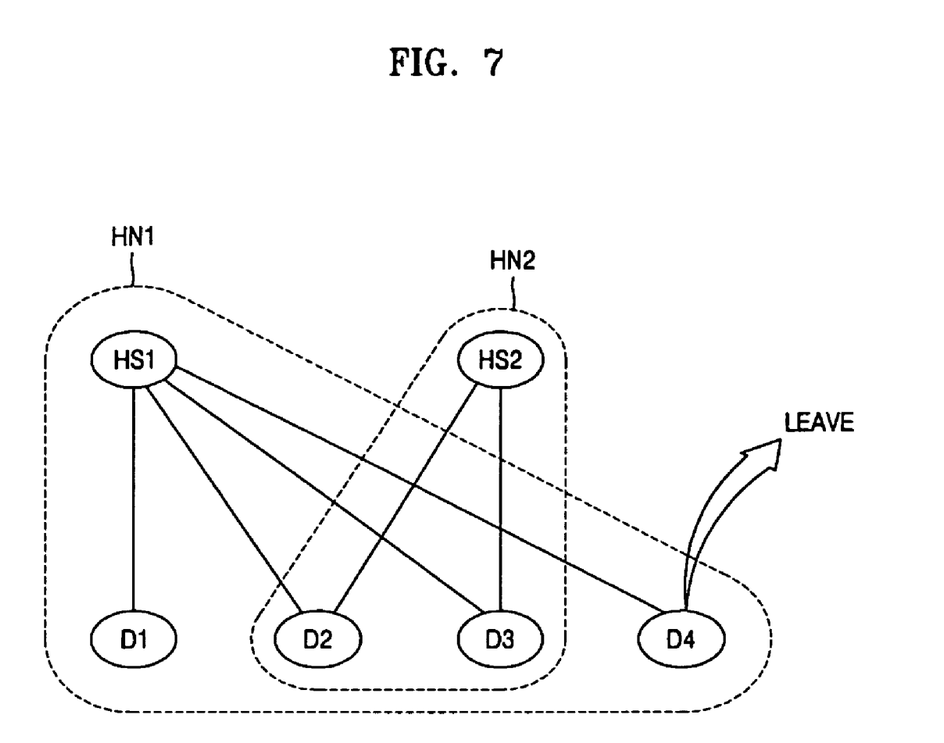
FIG. 7 is a diagram illustrating a structure of a home network having two or more home servers.

FIG. 7 is a diagram illustrating the structure of a home network having two or more home servers. One user device may belong to two or more home servers. Referring to FIG. 7, a first home network HN1 consists of a first home server HS1 and the user devices D1, D2, D3, D4 connected to the first home server HS1, and a second home network HN2 consists of a second home server HS2 and the user devices D2, D3 connected to the second home server HS2. The user device D4 withdraws from the first home network HN1 at time t2.

In this case, two or more session keys generated in each of the home servers HS1, HS2 are not identified using methods of receiving the session key shown in FIGS. 3 and 5. A method of receiving a session key shown in FIG. 8 provides solution to the above problem.

Figure 8:
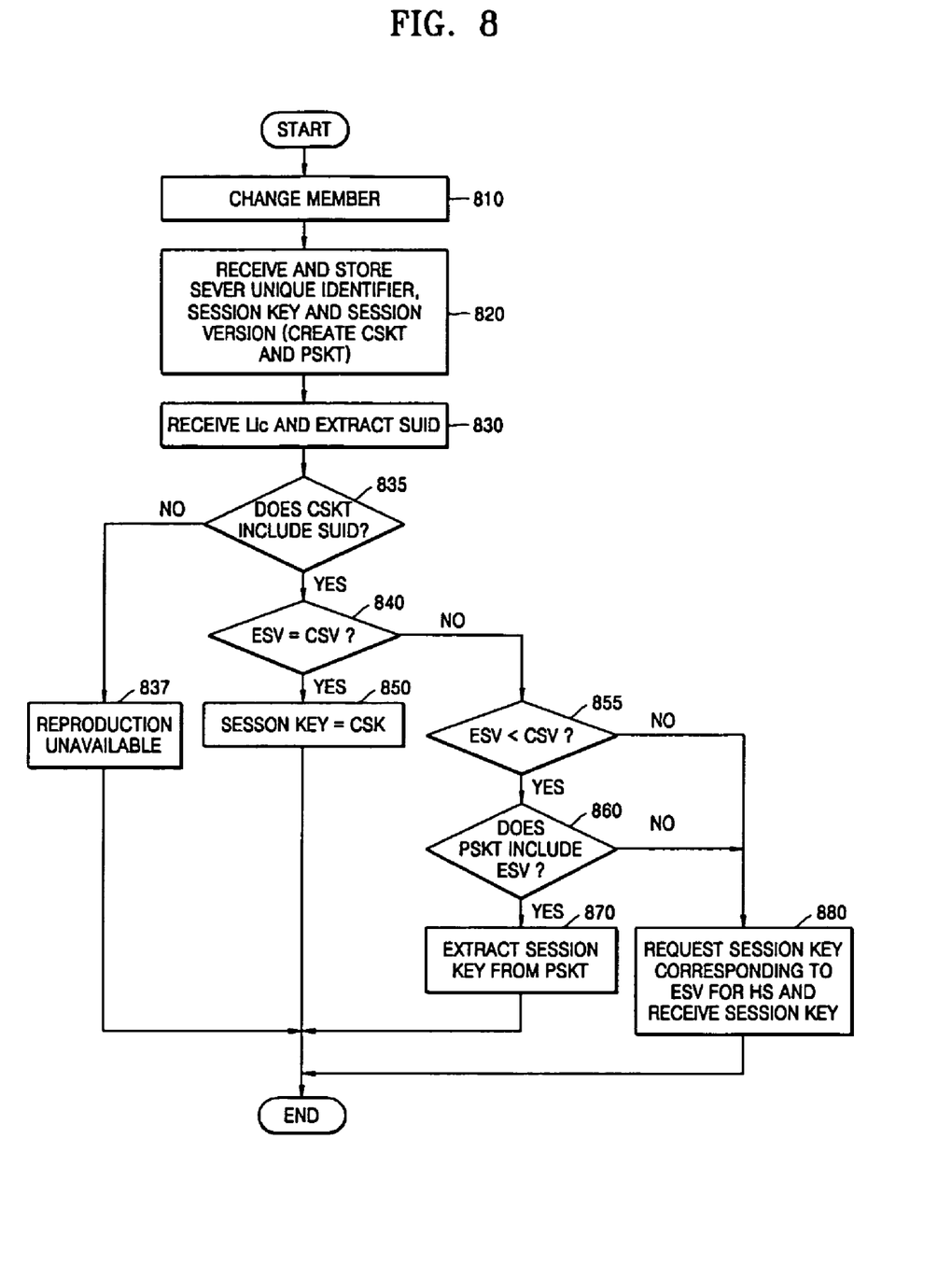
FIG. 8 is a flowchart illustrating a method of receiving a session key according to still another embodiment of the present invention.

FIG. 8 is a flowchart illustrating a method of receiving a session key according to still another exemplary embodiment of the present invention. Referring to FIG. 8, a subscription or withdrawal of a user device causes a change in members of a HN (Operation 810). Whenever one of the members of the HN changes, the user devices receives the session key, a session version indicating a session key generation sequence, and a server unique identifier (SUID) that is a identifier of a home server that generates the session key from one or more home servers (HS) and stores them (Operation 820).

The user device stores the SUID, a CSK, and a CSV in a CSKT, and the SUID, a PSK, and a PSV in a PSKT, respectively.

As shown in FIG. 7, since the user devices D2, D3 simultaneously join to the HN1 and the HN2, the CSKT and the PSKT of the user devices D2, D3 are shown in Table 9 and Table 10, respectively.

TABLE 9

| SUID (Server unique identifier) | CSV (current session version) | CSK (current session key) |
| --- | --- | --- |
| HS 1 | 0004 | 4444 |
| HS 2 | 0003 | 3333 |

TABLE 10

| SUID | PSV | PSK |
| --- | --- | --- |
| HS 1 | 0003 | 3333 |
| HS 1 | 0002 | 2222 |
| HS 1 | 0001 | 1111 |
| HS 2 | 0002 | 5678 |
| HS 2 | 0001 | 1234 |

As shown in FIG. 7, since the user device D1 joins only the HN1, the CSKT and the PSKT of the user device D1 are shown in Table 11 and Table 12, respectively.

TABLE 11

| SUID (server unique identifier) | CSV (current session version) | CSK (current session key) |
| --- | --- | --- |
| HS 1 | 0004 | 4444 |

TABLE 12

| SUID | PSV | PSK |
| --- | --- | --- |
| HS 1 | 0003 | 3333 |
| HS 1 | 0002 | 2222 |
| HS 1 | 0001 | 1111 |

In the first home network HN1 having the first home server HS1, the user device D4 withdraws from the first home network HN1 at time t2, and content Cont_A and content Cont_B are content before and after the withdrawal of the user device D4, respectively, and session keys distributed before and after the withdrawal of the user device D4 are K_sess and K_sess', respectively. Such circumstances are shown in Table 13.

TABLE 13

| | Time | |
| --- | --- | --- |
| | t1 | After t2 |
| Content/License | cont_A/Lic_A | cont_B/Lic_B |
| Content key | K_cont | K_cont' |
| Session Key/Session Version | K_sess/0003 | K_sess'/0004 |
| Joined User Devices | D1, D2, D3, D4 | D1, D2, D3 |

The license Lic_A before the withdrawal of the user device D4 is shown in Table 14.

TABLE 14

| SUID | HS 1 |
| --- | --- |
| ESV | 0003 |
| ECK | E(K_sess, K_cont) |

The license Lic_B after the withdrawal of the user device D4 is shown in Table 15.

TABLE 15

| SUID | HS 1 |
| --- | --- |
| ESV | 0004 |
| ECK | E(K_sess, K_cont) |

In the second home network HN2 having the second home server HS2, the user device does not change at time t2 as shown in Table 16.

TABLE 16

| | Time | |
| --- | --- | --- |
| | t1 | After t2 |
| Content/License | cont_C/Lic_C | cont_D/Lic_D |
| Content key | K_cont | K_cont |
| Session Key/Session Version | K_sess/0003 | K_sess/0003 |
| Joined User Devices | D2, D3 | D2, D3 |

In Table 16, content Cont_C and Cont_D, and licenses Lic_C and Lic_D are transmitted from the second home server HS2 to the user devices D2, D3.

Licenses Lic_C and Lic_D are configured as shown in Table 17 and Table 18, respectively.

TABLE 17

| SUID | HS 2 |
| --- | --- |
| ESV | 0003 |
| ECK | E(K_sess, K_cont_C) |

TABLE 18

| SUID | HS 2 |
| --- | --- |
| ESV | 0003 |
| ECK | E(K_sess, K_cont_D) |

K_cont_C and K_cont_D are content keys used to encode content Cont_C and Cont_D, respectively. Content keys K_cont_C and K_cont_D may be identical to or different from each other.

A user device receives a license Lic necessary for reproducing predetermined content, and extracts a SUID from the received license Lic (Operation 830).

The user device checks whether a CSKT of the user device includes the SUID extracted at Operation 830 (Operation 835). If the CSKT includes the SUID, Operation 840 is performed. If the CSKT does not include the SUID, Operation 837 is performed.

If CSKT includes the SUIP, then the user device extracts an ESV from the license Lic, and checks whether the extracted ESV is identical to a CSV of the CSKT (Operation 840). If the ESV is identical to the CSV, Operation 850 is performed.

The user device extracts a CSK corresponding to the CSV as the session key (Operation 850).

If the ESV is not identical to the CSV, Operation 855 is performed. the user device compares a size of the ESV with a size of the CSV (Operation 855). When the ESV is smaller than the CSV, Operation 860 is performed. When the ESV is larger than the CSV, Operation 880 is performed.

When the ESV is smaller than the CSV, the user device checks if a PSKT includes the ESV (Operation 860).

The user device extracts the session key corresponding to the ESV from the PSKT (Operation 870).

If the PSKT includes the ESV, Operation 870 is performed. If the PSKT does not include the ESV, Operation 880 is performed. When the ESV is larger than the CSV, or if the PSKT does not include the ESV, the user device requests the session key corresponding to the ESV for the HS, and receives the session key through the user authentication (Operation 880).

If the CSKT does not include the SUID, then the user device displays a reproduction unavailable message for a user (Operation 837).

According to the method of receiving the session key shown in FIG. 8, a license transmitted from a home server has a server identifier used to identify the home server, and a CSKT or a PSKT of the user device also has the server unique identifier. Therefore, since the user device can determine a session key that is required for content transmitted from the homer server to which the user device belongs, the present method can be applied to a home network in which one user device is connected to a plurality of home servers.

It is possible for the present invention to be realized on a computer-readable recording medium as a computer-readable code. Computer-readable recording mediums include every kind of recording device that stores computer system-readable data. ROMs, RAMs, CD-ROMs, magnetic tapes, floppy discs, optical data storage, etc. are used as a computer-readable recording medium. Computer-readable recording mediums can also be realized in the form of a carrier wave (e.g., transmission through the Internet).

According to an exemplary embodiment of the present invention, a home server transmits a session key and a session version to a user device whenever a subscriber to a home network changes, and the user device determines a session key using the session version, thereby providing a method of receiving the session key that makes it easy to perform a variety of domain administration tasks by freely transmitting contents between user devices, and a method of reproducing contents using the same.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of receiving a session key from a home server in a home network including a plurality of members, comprising:
   (a) whenever one of the members of the home network changes, receiving and storing the session key and a session version indicating a session key generation sequence;
   (b) receiving a license necessary for reproducing predetermined content; and
   (c) determining, by a processor, a session key necessary for reproducing the predetermined content based on an encoding session version (ESV), which is a session version extracted from the license, and the stored session version.

2. The method of claim 1, wherein the license includes a server unique identifier (SUID), which is an identifier of the home server, the method further comprising:
   (d), before determining operation (c), determining the session key necessary for reproducing the predetermined content by determining whether the SUID included in the license is a SUID of the home server to which a user device that receives the session key belongs.

3. The method of claim 1, wherein determining operations (c) and (d) are performed based on a current session key table (CSKT) in which the CSKT includes a SUID of a current home server, a current session version, and a current session key.

4. The method of claim 3, wherein the license includes an encoded content key which is generated by encoding the content key using the SUID, the session version, and the session key, and
   wherein determining operation (c) is performed by comparing the session version included in the license with the session version included in the CSKT.

5. The method of claim 3, wherein the license includes an encoded content key which is generated by encoding the content key using the SUID, the session version, and the session key, and
   wherein determining operation (d) is performed by determining whether the SUID included in the license belongs to the SUID of the CSKT.

6. The method of claim 3, wherein determining operations (c) and (d) are performed based on a previous session key table (PSKT) in which the PSKT includes at least one SUID of a previous home server, at least one previous session version, and at least one previous session key.

7. The method of claim 6, wherein determining operation (c) comprises:
   (c1) when the session version of the license is identical to the current session version, determining the current session version as the session key; and
   (c2) when the session version of the license is smaller than the current session version, checking whether the PSKT includes the session version of the license, and if the PSKT includes the session version of the license, determining a previous session key as the session key.

8. The method of claim 6, wherein determining operation (d) comprises:
   (d1) when the SUID of the license is not identical to the SUID of the CSKT, determining the content as reproduction unavailable.

9. The method of claim 1, further comprising:
(e) when a session key necessary for reproducing the content is not identical to the stored session key, renewing the session key by receiving a latest session key and a session version of the latest session key from the home server of the home network.

10. A method of receiving predetermined content from a first user device in a home network including a plurality of user devices, and reproducing the predetermined content by a second user device, comprising:
(a) whenever one of the user devices of the home network changes, receiving and storing a session key and a session version indicating a session key generation sequence which are necessary for reproducing the predetermined content;
(b) receiving encoded content using a predetermined content key, and a license necessary for reproducing the predetermined content from the first user device;
(c) determining, by a processor, a session key necessary for reproducing the predetermined content based on a session version included in the license and the stored session version; and
(d) generating a content key using the determined session key, and reproducing the encoded content using the generated content key.

11. The method of claim 10, wherein the license includes a SUID which is an identifier of the home server, further comprising:
(e), before determining operation (c), determining the session key necessary for reproducing the predetermined content by determining whether the SUID included in the license is a SUID of the home server to which a user device that receives the session key belongs.

12. The method of claim 11, wherein determining operations (c) and (e) are performed based on a CSKT in which the CSKT includes a SUID of a current home server, a current session version, and a current session key.

13. The method of claim 12, wherein the license includes an encoded content key which is generated by encoding the content key using the SUID, the session version, and the session key, and
operation (c) is performed by comparing the session version included in the license with the session version included in the CSKT.

14. The method of claim 12, wherein the license includes an encoded content key which is generated by encoding the content key using the SUID, the session version, and the session key, and
wherein operation (e) is performed by determining whether the SUID included in the license belongs to the SUID of the CSKT.

15. The method of claim 12, wherein determining operations (c) and (e) are performed based on a PSKT in which the PSKT includes one or more SUIDs of a previous home server, one or more previous session versions, and one ore more previous session keys.

16. The method of claim 10, further comprising:
(f) before determining operation (d), when a session key necessary for reproducing the content is not identical to the stored session key, renewing the session key by receiving a latest session key and a session version of the latest session key from the home server of the home network.

17. A non-transitory computer-readable storage medium having embodied thereon a computer program for executing the method of claim 1.

18. A non-transitory computer-readable storage medium having embodied thereon a computer program for executing the method of claim 10.

* * * * *